(12) United States Patent
Schatzberg

(10) Patent No.: US 6,615,284 B2
(45) Date of Patent: Sep. 2, 2003

(54) METHOD AND APPARATUS FOR PERFORMING INPUT/OUTPUT OPERATIONS BETWEEN A REQUESTING DEVICE AND RESPONDING DEVICE

(76) Inventor: Alon Schatzberg, 34 Wesley St., North Andover, MA (US) 01845

( * ) Notice: Subject to any disclaimer, the term of this patent is extended or adjusted under 35 U.S.C. 154(b) by 20 days.

(21) Appl. No.: 10/156,574

(22) Filed: May 28, 2002

(65) Prior Publication Data

US 2002/0144028 A1 Oct. 3, 2002

Related U.S. Application Data

(63) Continuation of application No. 08/741,542, filed on Oct. 31, 1996, now abandoned.

(51) Int. Cl.[7] ................................................. G06F 3/00
(52) U.S. Cl. ......................................................... 710/1
(58) Field of Search ............................... 710/1, 10, 20, 710/36; 711/100, 111, 112, 114

(56) References Cited

U.S. PATENT DOCUMENTS 5,392,443 A * 2/1995 Sakakibara et al. ............ 712/9
5,519,849 A * 5/1996 Malan et al. ................. 711/114
5,623,595 A * 4/1997 Bailey ............................. 714/6
5,664,144 A * 9/1997 Yanai et al. ................. 711/113

* cited by examiner

*Primary Examiner*—Matthew C. Bella
*Assistant Examiner*—Mackly Monestime

(57) ABSTRACT

A method and system for retrieving large contiguous data files is provided. The method divides the data during the storage operation such that it spans two or more logical volumes. The data may be stored over the plurality of volumes in any convenient manner such as in the case of two logical volumes, storing the even address data on one device and the odd address data on the other device. During an access request (either a read or a write) a host controller receiving the access request will generate as many access requests as are associated with the storage of the data to associated storage controllers. The storage devices are coupled via separate busses to their respective storage controllers and thus several storage devices may communicate with their associated controllers simultaneously. The data may now be delivered to the host controller from the two or more storage devices simultaneously thus drastically improving data throughput. The host controller receives the data from the two or more storage controllers and re-assembles the data into a contiguous file and delivers it to the requesting device.

3 Claims, 4 Drawing Sheets

METHOD AND APPARATUS FOR PERFORMING INPUT/OUTPUT OPERATIONS BETWEEN A REQUESTING DEVICE AND RESPONDING DEVICE

This is a Continuation of application Ser. No. 08/741,542 filed Oct. 31, 1996 now abandoned.

BACKGROUND OF THE INVENTION

This invention relates generally to storage systems associated with computer systems and more particularly to providing a method for improving the data throughput associated with a storage system during long sequential input/output (I/O) transactions.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers over a network. Such a model allows for the centralization of data which is to be shared among many users and also allows a single point of maintenance for the storage functions associated with computer systems.

One type of storage subsystem known in the art is one which includes a number of redundant disk storage devices configured as an array. Such a system is typically known as a RAID storage system. One of the advantages of a RAID type storage system is that it provides a massive amount of storage (typically in the several gigabyte range) and depending upon the RAID configuration may provide several differing levels of fault tolerance. Fault tolerance is typically achieved by providing, in addition to the disk devices that are used for storing the data, a disk device which is used to store parity data. The parity data may be used in combination with the remaining data on the other disk devices to reconstruct data associated with a failed disk device.

A disk storage system such as the RAID system described above will typically include one or more front end (or host) adapters/controllers which are responsible for receiving and processing requests from the various host devices which may be connected to the storage system. Additionally, a RAID storage system as described above may also include several disk adapters/controllers which are used to control the transactions between the disk storage devices and the host controller/adapter described above. Some storage systems may also include a very large buffer (e.g. a cache memory) for buffering the data transfers between the disk adapters and the host adapters.

In addition, a requirement of typical present day storage systems is that they present (or emulate) a particular storage geometry to the host computer. The geometry includes the configuration of the storage devices (i.e. number of cylinders, heads, sectors per track, etc.). The geometry presented to the host may not be the actual physical configuration of the storage devices in the system. As a result, some level of translation must be carried out between the emulated storage parameters and the physical storage parameters.

The problem associated with front-end emulation and back-end control is to relegate the two responsibilities in two separate processors. The front-end processor manages all that concerns operation of the front-end (host) controller. That is, it maintains information about the file system such as list of logical volumes and logical subdivisions such as cylinders, tracks, etc. The back-end processor manages tasks which are transparent to the host such as data mirroring, data striping, RAID protection, concurrent copy and others. As such, the back-end processor is typically loaded with much more functionality than the front-end processor.

In a RAID storage system as described above, the storage system (front-end processor) may be connected to the host via a bus which has different physical characteristics (e.g., data throughput, contention time, etc.) than the bus which connects the physical devices to the storage controller (back-end processor). For example, the host adapter may be coupled to the network (i.e., host or requesting systems) via a so called wide SCSI bus operating at speeds which allow the transfer of data up to 20 megabits per second. The host adapter is then typically coupled to either a cache or directly to a disk adapter via a communication bus which allows for data transmission rates which are at least as fast as the wide SCSI bus. The disk adapters, however, may be connected to the associated disk storage devices by a so called narrow SCSI bus which runs at half the speed as a wide SCSI bus (i.e., data rates up to 10 megabits per second).

It will be appreciated by those of skill in the art that for the configuration described above, the transmission rate mismatch may result in a performance bottleneck during long sequential input/output activity. That is, during a read of large amounts of sequential data, the associated disk device will transmit its data to the disk controller at a rate, which is half the speed at which the host controller can transmit the data to the requesting device. Thus the host adapter, and, as a result, the host device spend an inordinate amount of time waiting for data and thus wasting processing time. Similarly, when a host device needs to write a large amount of sequential data to a particular disk storage device, the host device will be able to transmit the data to the host adapter at a rate which is twice as fast as the rate at which the disk adapter can transmit the data to storage device. As a result the host devices and its associated bus would be stalled while it waited for the disk adapter to transmit the associated data to the disk.

Two attempts at solving the above problem have included the use of pipelining techniques or so called prefetch mechanisms. During pipelining, for a read operation, the host adapter will be begin transferring the associated data to the requesting host device before the entire read has been satisfied from the disk adapter into the associated buffer or cache. The objective of this technique is to tune the data transfer such that data is transferred to the host device by the host adapter in blocks of data such that one block has been completely transferred to the host device just after the disk adapter has finished placing the next sequential block of data into the cache for transfer. A similar scheme is employed during writes of data with the transfer from data to the disk device from the host adapter.

The second approach which utilizes a prefetch scheme involves the use of caching algorithm which is designed to minimize the occurrences of cache misses. To do so, large amounts of data are prefetched from the disk storage device into the cache with the belief that the data prefetched will be that data which is requested by the host device and thus eliminate a second transaction from the disk adapter to the disk storage device to place the data in the cache for transfer to the host device. The drawback to the prefetching scheme is that its effectiveness depends crucially on the size of the cache and assumes that the disk adapter is not continuously busy fulfilling I/O requests.

It would be advantageous, therefore, to provide a system which allows long sequential I/O transactions between a disk storage device and a host device to occur without the usual bottlenecks associated with such a transfer.

SUMMARY OF THE INVENTION

In accordance with the present invention, a method of performing input/output operations between a requesting device and a responding device, where the responding device includes a plurality of storage devices, includes the following steps. In response to receipt of a write access request by a requesting device, where the write access is a write of a sequential block of data, portions of the block of sequential data are stored on each of the plurality of storage devices. In response to receipt of a read access request by the requesting device for the previously stored block of sequential data, an access request is generated to each of the storage devices on which the portions of data are stored. Each of the portions of the block of sequential data is retrieved from each of the plurality of storage devices and the retrieved portions are assembled into the original block of sequential data and the retrieved portions are transmitted to the requesting device as a block of sequential data. With such an arrangement, data may be delivered to a requesting device at a constant rate without stalling even though the communications path to any one of the storage devices is slower than the communication rate of the requesting device.

In accordance with another aspect of the present invention, a storage system is provided which includes a plurality of storage devices each configured to store blocks of data. The storage system further includes a plurality of storage controllers where each storage controller is coupled respectively to one of the storage devices. Each of the storage controllers is operable to transmit and receive data to and from its corresponding storage device. The storage system further includes a request controller which receives from a requesting device an access request for a sequential block of data. The request controller is coupled to each of the storage controller and is responsive to the access request for generating an access request to each of the plurality of storage controllers having the portions of data associated with the requested sequential block stored thereon. With such an arrangement, a storage system is provided which allows for increased performance for transactions involving large amounts of sequential data since the data may be stored and subsequently retrieved from several individual devices rather than retrieved as a stream from a single device.

BRIEF DESCRIPTION OF THE DRAWINGS

The above and further advantages of the present invention may be better understood by referring to the following description taken in conjunction with the accompanying drawings in which.

DETAILED DESCRIPTION OF THE PREFERRED EMBODIMENT

Figure 1:
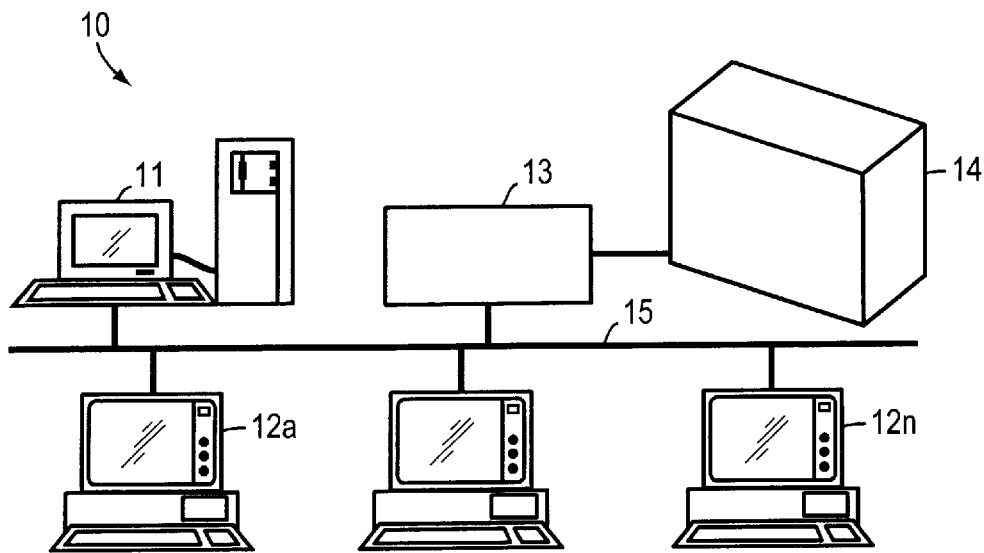
FIG. 1 is a block diagram representation of a networked computer system.

Referring now to FIG. 1, network computer system 10 is shown to include inter alia, computers 11 and 12a though 12n coupled to server 13 via network or bus 15. Computers 11 and 12a through 12n may be any one of several well known types of computers such as personal computers or workstations. Server 13 is further coupled to storage system 14 thereby providing a link between individual computers 11 and 12 to storage system 14 via server 13. Like many network computer systems, server 13 typically provides the scheduling and routing of data between any of the individual computers 11 and 12 and disk storage subsystem 14 as well as between the individual computers 11 and 12 themselves. Although not shown, storage system 14 may also be connected to several servers similar to server 13 and thereby service several other network computer systems. Additionally, storage system 14 may be coupled directly to one or more individual computer systems rather than being connected to several computers through a server such as server 13.

Storage system 14 may include several individual storage devices such as magnetic disks as well as controller cards and cache memory all housed within a single enclosure. For purposes of discussion, the preferred embodiment will be described according to the notion that storage elements included within storage system 14 are magnetic disks. It should be noted however that the storage elements could be any storage medium, which allows storage and retrieval of data (for example, random access memory or magnetic tape or optical disks) and thus should not be seen as a limitation of the present invention.

Figure 2:
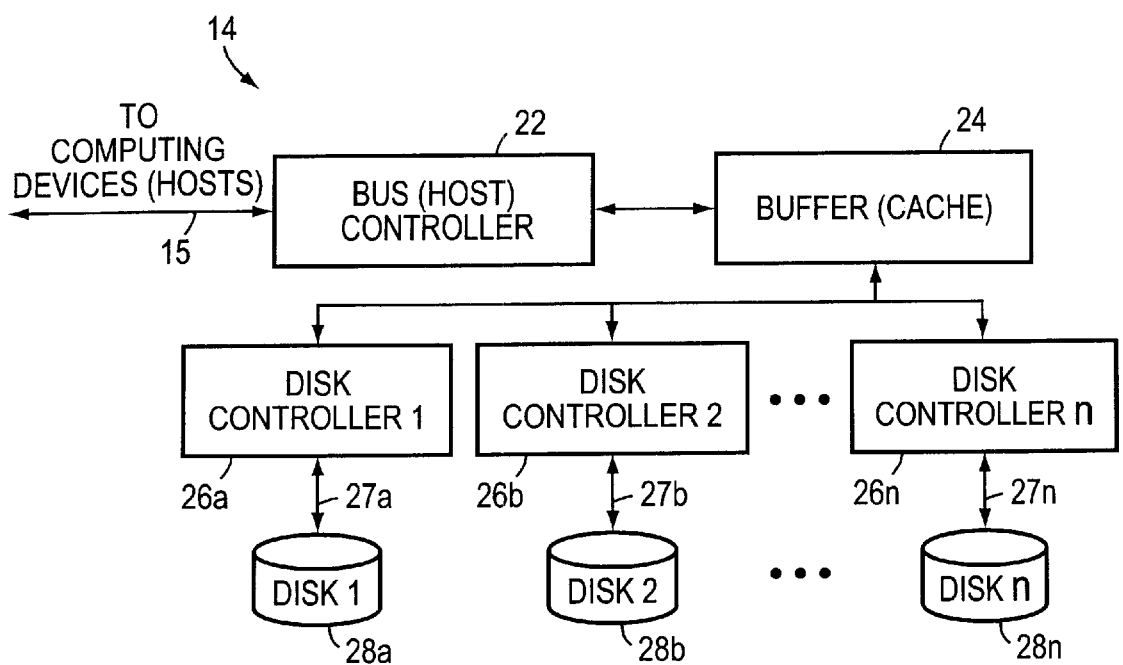
FIG. 2 is a diagrammatic representation of the disk storage subsystem of the computer system of FIG. 1.

Referring now to FIG. 2, storage system 14 of FIG. 1 is shown in more detail to include among other things, a bus or host controller 22 coupled to a buffer or cache 24, which is further, coupled to a plurality of disk controllers 26a through 26n. Each of the controllers 26a–26n is further coupled respectively to storage devices 28a through 28n. Although not shown in the Figures, each controller 26a–26n may control a plurality of physical storage devices. According to the preferred embodiment, here storage devices 28a through 28n are magnetic disk devices. Storage system 14 communicates or transfers data to and from requesting devices via bus 15. Requests by one of the computers connected via server 13 to storage subsystem 14 will be received by a bus controller 22 and, as will be described in further detail below, will provide the appropriate request to the individual disk controller or disk controllers corresponding to the storage devices which contain the data to be read or are the target devices of data to be written.

Figure 3:
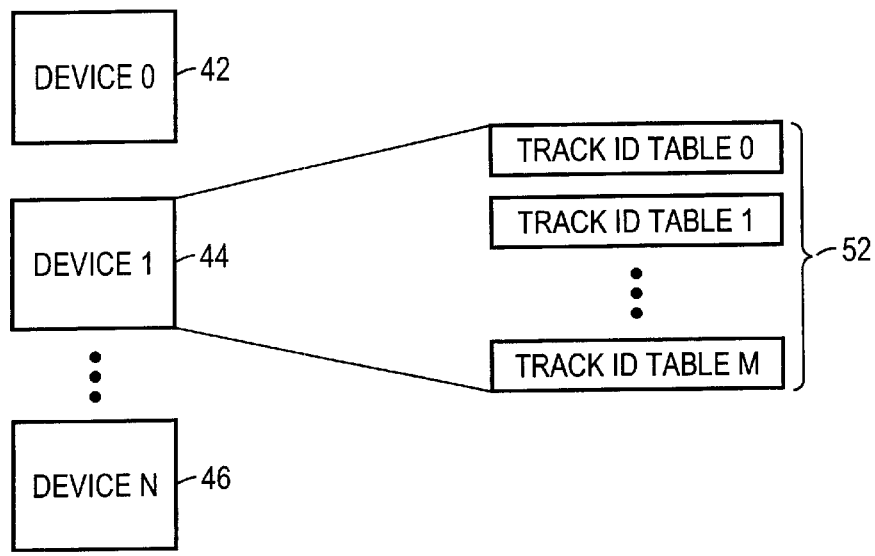
FIG. 3 is a diagrammatic representation of device ID tables associated with prior art bus controllers.

According to a preferred embodiment of the present invention, the host controller determines which storage device to which to generate the access request using a data structure here called a device ID table. Referring now to FIG. 3, one example of device ID tables is shown. Each logical device has an associated device ID table (for example table 44) which includes a plurality of track ID tables 52 which further include information used to locate the track in cache memory.

Figure 4:
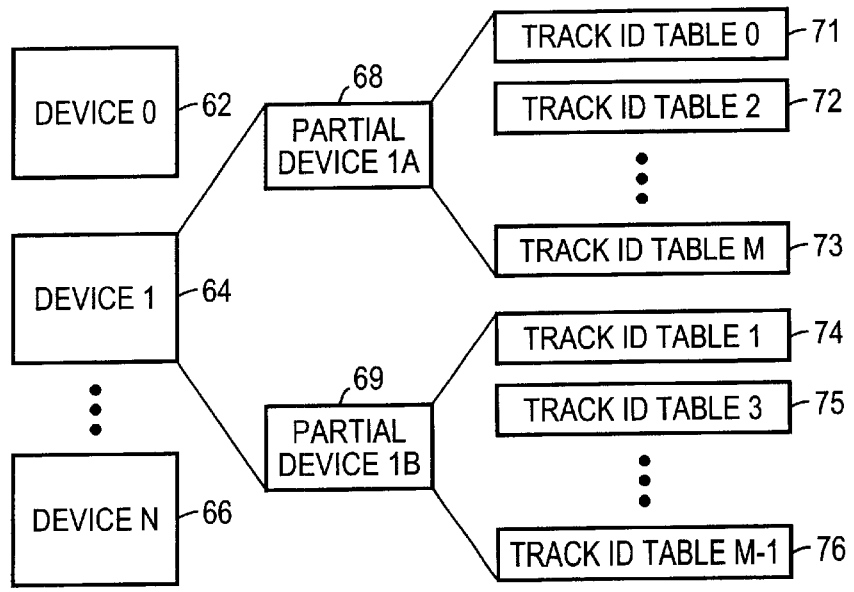
FIG. 4 is diagrammatic representation of device ID tables associated with prior art bus controllers and the method for storing data according to the present invention.

Referring now to FIG. 4 and according to the present invention, a device ID table structure is shown as having a hierarchical structure and including a linear succession of track ID tables which are grouped into cylinders to provide a cross reference to the disk devices. As shown, there is a device ID table for each logical device of the system. In addition, a device ID table (e.g. associated with device 64)

is broken down into (or includes) two partial device ID tables 68 and 69. Each of the partial tables further includes a plurality of track ID tables. Here each of the track ID tables accommodates 40H blocks of data. The track ID tables include among other things pointers into the cache memory 24 where a particular track associated with one of the storage devices is located should the track be currently stored in the cache. The logical blocks of data may be mapped contiguously onto the track ID table.

The individual disk controllers 26a–26n (FIG. 2) each maintain a separate cross-reference table (not shown) that relates a particular track in a particular logical volume to its locations on a physical storage device. The mapping from the track ID table into the cylinder head sector structure for a disk storage device is contiguous as well. Generally, each logical device may be mapped by a disk controller into a part of a single physical storage device (or disk). When an I/O request arrives at the bus controller, the corresponding track ID table is identified by the bus controller through a direct calculation from which it identifies the disk controllers, which will be responsible for handling the I/O request. Consequently the bus controller posts a read or write request to each of the identified disk controllers' associated request buffer (not shown) which is identified in the device ID table. During normal operation the disk controllers poll their corresponding request buffers and fulfill I/O requests accordingly.

As will be described in more detail below, rather than store sequential data contiguously on a single disk, the present invention interleaves portions of logically sequential data over two or more disks. It would be expected that the task of interleaving data between physical disks should be handled by the disk controllers. This is the process which would need to be followed using the device ID table structure of FIG. 3. However, according to the present invention, the bus controller 22 is operable to provide the interleaving of data across many physical disks. This is accomplished in part by providing an increased number of device ID tables, as described above, where each logical device is actually represented by, what would appear from the disk controllers' perspective, two or more devices, each of which houses even and odd numbered tracks (in the case of a 2:1 interleave ratio). Using the device ID table structure described above, the bus controller takes on the responsibility for posting sequential I/O requests to the corresponding splits (disks) of a logical volume in a manner which is completely transparent to the disk controllers. This method of interleaving data on a storage system simplifies the complexity of design for the disk controllers since functionality which would ordinarily require the addition of further complexity to already complex disk controller software is now achieved through the intelligent use of elaborate device ID tables in the bus controller.

According to the preferred embodiment, in order for the host adapter to generate access requests to the disk devices holding (or being the destination of) the associated data, the additional device ID tables described above are provided (the number dictated by the number of disks over which the data is spread). For example, assuming that a sequential block of data is split between two disk devices, there are two device ID tables, one corresponding to the even track ID tables, and one corresponding to the odd track ID tables (see FIG. 4).

According to preferred embodiment of the present invention, bus 15 which connects the bus controller to the external devices such as server 13 is a so called wide SCSI bus. A wide SCSI bus is typically 16 bits in width and can transmit up to 20 megabits of data per second. Further in accordance with a preferred embodiment of the present invention, busses 27a through 27n which couple disk controllers 26a through 26n respectively to disk devices 28a through 28n are narrow SCSI busses which are typically 8 bits in width and can transmit data at a rate of up to 10 megabits per second.

As described earlier, the mismatch in speeds between bus 27a through 27n and bus 15 may cause a condition where any one of the host devices may be stalled waiting for data to be delivered from one of the disk devices or stalled waiting to be able to write data to one of the disk devices. This is a result of the host device being able to transmit at a speed, which is here twice as fast as the speed at which the disk controller can communicate with the storage device. In accordance with the present invention, a method is provided which allows the disk devices to satisfy the data access request from any one of the host devices without experiencing the stall condition previously described.

Figure 5:
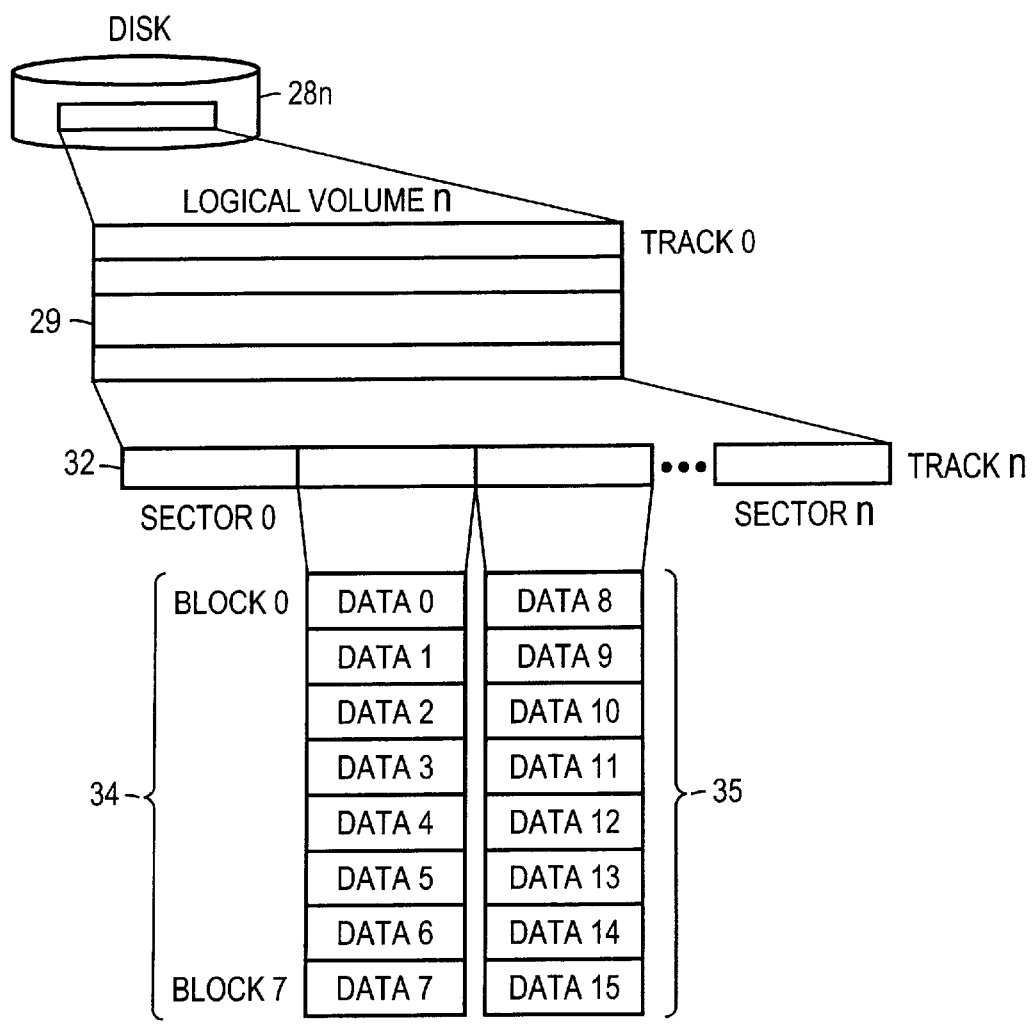
FIG. 5 is a diagrammatic representation of the storage techniques associated with data stored on the disks of the storage system of FIG. 2 using the device ID tables of FIG. 4.

Referring now to FIG. 5, an exemplary one of disks 28a through 28n of FIG. 2 is shown. Data is typically stored on disk 28n which may contain one or several logical volumes where a logical volume is a means to identify a particular section of storage device for disk 28n and thus allow access to the data stored within that logical volume. The logical volumes of disk 28n are further divided into a number of tracks, here track 0 through track n, where the tracks are further divided into sectors 32. Finally, the sectors are divided into sets of blocks 34 where here set of blocks 34 contains eight blocks labeled block 0 through block 7. It should be understood that a contiguous section of data might typically span several blocks in several sectors as well as several tracks. As shown in the Figure, a sequential data file is shown to include blocks data1 through data 15 and is stored sequentially in blocks 0–7 of each sector 34 and 35. One example of a large amount of sequential or contiguous data is a video or movie or audio or some other large amount of data which is typically delivered in a stream or contiguous format. The format shown for the storage of data1-data15 is typical of prior art systems. To achieve this type of data arrangement on the physical drives, the device ID tables of FIG. 3 would typically be used to generate the access request. That is, this scheme results in the data being stored on a single logical volume thereby requiring that the delivery of the data occur over a single bus, such as bus 27, to a single disk controller, ultimately to the requesting host device.

According to the present invention, rather than store the contiguous blocks of data as described in connection with FIG. 5 on a single logical volume and thereby require communication over a single bus, the contiguous data is here distributed over two or more logical volumes associated with different disk controllers thus allowing for the retrieval of data from the storage device 14 at a faster rate.

Figure 6:
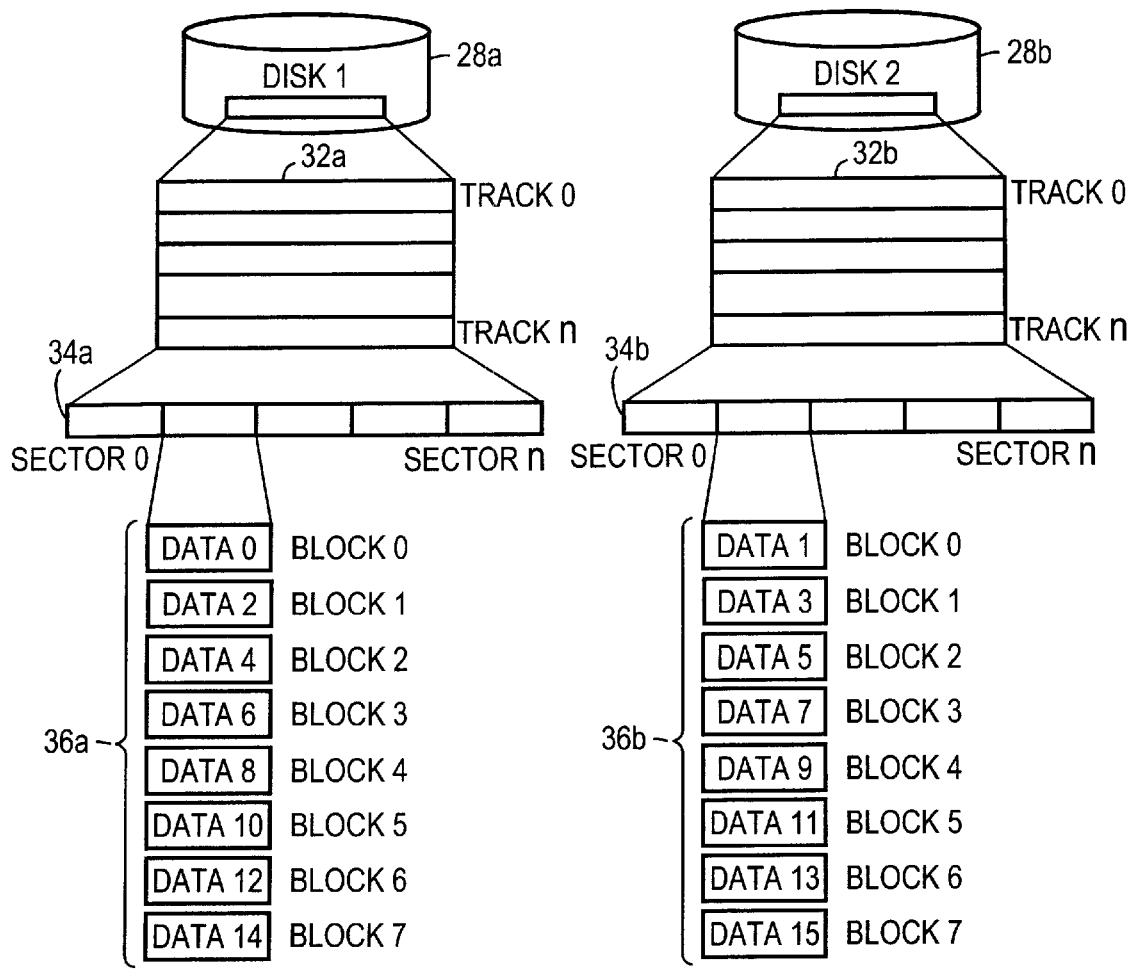
FIG. 6 is a diagrammatic representation of the storage techniques associated with data stored on the disks of the storage system of FIG. 2 and device ID tables of FIG 4.

Referring now to FIG. 6, disks 28a and 28b of storage system 14 (FIG.1) are shown to have the same structure of data storage as a disk associated with FIG. 5 down to and including the sector segmentation of the disk. However, unlike the arrangement shown in FIG. 3, data will be stored according to the present invention such that the even address blocks of data for a large contiguous file will be stored on disk 28a (controlled by controller 26a (FIG. 2)) while the odd blocks of a large section of contiguous data will be stored on disk 28b (controlled by controller 26b (FIG. 2)). This arrangement of data results in the even blocks of the contiguous data file being stored in sector 36a of disk 28a while the odd blocks of the contiguous data file are stored in sector 36b of disk 28b.

Referring back to FIG. 2, it should be noted that each of the disk controllers associated with the respective disk devices can communicate with their associated disk devices simultaneously. Thus, when a host device requests an access to a large contiguous section of data, for example, during a read transaction, bus controller 22 rather than initiating a single access request to a single controller, will here, according to the present invention, generate an access request to each of the disk controllers 26a and 26b which will then each simultaneously retrieve the associated even and odd blocks of data associated with the access request. It should be understood that disk controllers 26a and 26b do not need to have any knowledge of the arrangement of the data stored on the respective disk and thus can respond to a request as previously done. A request to each of the controllers will merely include a staffing address and ending address of the required data and disk controllers will access their disk devices and deliver the data through buffer 24 ultimately to bus controller 22. As described above, the tracking of which device stores which sections of data is done through the device ID tables and associated track ID tables.

In order for the host devices to receive the requested data in the required format, bus controller 22 assembles the data as it receives it from the disk controllers 26a and 26b and re-assembles the even and odd blocks to provide the correct contiguous section of data. As can be seen then, since controllers 26a and 26b can communicate simultaneously with their associated disks 28a and 28b, data can be delivered at twice the speed that would be achieved if data were only being delivered from or to a single device (disk controller). Therefore, the host devices will not experience a bottleneck or a hold-off condition waiting for data to be delivered from or delivered to the disk devices of storage system 14. The above description made the assumption that only two disks or arrays of disks (i.e. communications with two controllers) were used for the storage of a large contiguous section of data. Thus the even blocks of data were shown to be stored on one disk(s) while the odd blocks of data were shown to be stored on a second disk(s). It should be understood, however, that this concept is extendable to disks associated with several controllers and is only limited by the number of controllers (and associated disks) available and the data bandwidth required to satisfy the speed of the host devices. That is, for example, if data need to be delivered at four times the speed of busses 27a through 27n then four disks (or arrays of disks) could be used to store a large section of contiguous data with every fourth block being stored respectively on every fourth disk. Thus a request for the contiguous block of data received at bus controller 22 would cause bus controller 22 to generate four access requests to each of the respective four disk controllers associated with the disks containing the every fourth block of contiguous data. Upon delivery of the data from the disks to the bus controller, the bus controller would reassemble the data received from the four disk devices and deliver it to the host or requesting devices a single contiguous block of data.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A method for improving the data throughput associated with a storage system having sequential input/output transactions, said storage system having at least one requesting device, each said requesting device attached to a request controller having a memory, said request controller attached to at least two disk controllers, each said at least two disk controllers attached to at least two storage devices, said storage devices portioned into a plurality of tracks, said method comprising the steps of:

responsive to a write access request from said requesting device said request controller segmenting a continuous section of data into a plurality of even datum and a plurality of odd datum;

providing a plurality of device identification tables located in the memory of said request controller, each of said identification tables corresponding to one of said storage devices, each of said plurality of identification tables partitioned into a first partial identification table having even track identification tables and a second partial identification table having odd track identification tables, said plurality of track identification tables having track location information used to locate said track in said memory of said storage device;

said request controller using said identification tables to interleave said even datum and said odd datum over two of said storage devices using said even track identification tables corresponding to a first of said two storage devices and said odd track identification tables corresponding to a second of said two storage devices using said device identification tables;

providing a cross reference table in each of said at least two disk controllers, each said cross reference table relating said tracks to said storage device attached to said disk controller;

a first of said disk controllers depositing said even datum on said first of said storage devices using a first of said cross reference tables;

a second of said disk controllers depositing said odd datum on said second of said storage devices using a second of said cross reference tables;

responsive to a read access request from said requesting device for a continuous section of data, said request controller generating corresponding storage devices and track location information from said identification tables for said plurality of even datum and said plurality of odd datum;

substantially simultaneously retrieving said plurality of even datum and said plurality of odd datum by said disk controllers;

transmitting said plurality of even datum and said plurality of odd datum to said request controller; and assembling said plurality of even datum and said plurality of odd datum into the single continuous section of data.

2. A storage system having sequential input/output transactions, said storage system having at least two storage devices segmented into a plurality of tracks for storing segmented data, said storage system having at least two disk controllers, each said at least two disk controllers coupled to said at least two storage devices, said at least two disk controllers operable to store and request data from said at least two storage devices, said storage system having at least one requesting device for generating a read access request and a write access request, said read access request operable to initiate retrieval of a sequential block of data from said at least two storage devices, said write access request operable to initiate storage of a sequential block of data in said at least two storage devices, said storage system comprising:

a cross reference table in each of said at least two disk controllers, said cross reference table relating particular tracks to locations on corresponding said at least two storage devices, said disk controller operable to deposit said segmented data on said storage devices by means of said cross reference table; and a request controller in cooperation with said at least one requesting device and said at least two disk controllers, said request controller operable to segment a sequential block of data into a plurality of even datum and a plurality of odd datum, said request controller having a plurality of device identification tables in the memory, each of said identification tables corresponding to one of said storage devices, each of said plurality of identification tables partitioned into a first partial identification table having an even track identification table and a second partial identification table having an odd track identification table, said plurality of track identification tables having track location information used to locate said track in said memory of said storage device, said request controller operable to interleave said even datum to said even track identification tables and said odd datum to said odd track identification tables thereby locating said even and odd datum among two separate storage devices, said request controller operable to generate corresponding storage devices and track location information for said plurality of even datum and said plurality of odd datum from said identification tables upon receipt of said read access request, said request controller operable to receive said segmented data from said disk controllers substantially simultaneously, said request controller operable to reassemble said plurality of even datum and said plurality of odd datum into said sequential block of data.

3. A program product for improving data throughput in a computer storage system having sequential input/output operations, said storage system having at least one requesting device, each said requesting device coupled to a request controller having a memory, said request controller coupled to at least two disk controllers, each said at least two disk controllers coupled to at least two storage devices, said storage devices segmented into a plurality of tracks, the program product including a computer readable medium with computer-executable program code configured for causing the following computer-executed steps to occur:

responsive to a write access request from said requesting device said request controller segmenting a continuous section of data into a plurality of even datum and a plurality of odd datum;

providing a plurality of device identification tables located in the memory of said request controller, each of said identification tables corresponding to one of said storage devices, each of said plurality of identification tables partitioned into a first partial identification table having even track identification tables and a second partial identification table having odd track identification tables, said plurality of track identification tables having information used to locate said track in said memory of said storage device;

said request controller interleaving said even datum and said odd datum using said even track identification tables and said odd track identification tables referencing said at least two storage devices using said device identification tables;

providing a cross reference table in each of said at least two disk controllers, said cross reference table relating said tracks to said storage device;

a first of said disk controllers depositing said even datum on said first of said storage devices using a first of said cross reference tables;

a second of said disk controllers depositing said odd datum on said corresponding tracks on said second of said storage devices using a second of said cross reference tables;

responsive to a read access request from said requesting device for a continuous section of data, said request controller generating corresponding storage devices and track location information from said identification tables for said corresponding plurality of even datum and said corresponding plurality of odd datum;

substantially simultaneously retrieving said corresponding plurality of even datum and said corresponding plurality of odd datum by said disk controllers;

transmitting said plurality of even datum and said plurality of odd datum to said request controller; and assembling said plurality of even datum and said plurality of odd datum into a single continuous section of data.

* * * * *